US010730114B2

(12) United States Patent
Liu et al.

(10) Patent No.: US 10,730,114 B2
(45) Date of Patent: Aug. 4, 2020

(54) DEVICE FOR TRIMMING POSITIONING END SURFACE OF WHEEL BLANK

(71) Applicant: CITIC Dicastal CO., LTD, Qinhuangdao (CN)

(72) Inventors: Huiying Liu, Qinhuangdao (CN); Shoujun Fu, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 0 days.

(21) Appl. No.: 16/384,215

(22) Filed: Apr. 15, 2019

(65) Prior Publication Data
US 2020/0001373 A1    Jan. 2, 2020

(30) Foreign Application Priority Data

Jul. 2, 2018    (CN) .......................... 2018 1 0705138

(51) Int. Cl.
*B23B 5/02*    (2006.01)
*B23Q 3/18*    (2006.01)

(52) U.S. Cl.
CPC . *B23B 5/02* (2013.01); *B23Q 3/18* (2013.01)

(58) Field of Classification Search
CPC .......... B23B 5/02; B23B 5/28; B23B 2215/08
See application file for complete search history.

(56) References Cited

U.S. PATENT DOCUMENTS 10,399,204 B2 *    9/2019    Liu .................. B24B 29/005

FOREIGN PATENT DOCUMENTS

DE            1477382 A1 *    10/1969    ............... B23B 5/02

* cited by examiner

*Primary Examiner* — Alan Snyder
(74) *Attorney, Agent, or Firm* — Calfee, Halter & Griswold LLP (57) ABSTRACT

The present application discloses a device for trimming the positioning end surface of a wheel blank comprises a wheel positioning clamping system, an axial positioning surface trimming system and a radial positioning surface trimming system. The wheel positioning clamping system completes the loading, clamping and low-speed rotation of the wheel; the axial positioning surface trimming system firstly completes the detection of the wheel axial hop, and then completes the trimming of the axially positioning surface; the radial positioning surface trimming system firstly completes the detection of the wheel radial hop, and then completes the trimming of the radial positioning surface. The axially positioning surface trimming system and the radial positioning surface trimming system are independent of each other and complementary to each other, and the two systems accomplish the trimming of the positioning end surface of the wheel blank jointly.

2 Claims, 4 Drawing Sheets

DEVICE FOR TRIMMING POSITIONING END SURFACE OF WHEEL BLANK

CROSS-REFERENCE TO RELATED APPLICATIONS

This application claims priority to Chinese Patent Application No. 201810705138.X, filed on Jul. 2, 2018, which is hereby incorporated by reference in its entirety.

TECHNICAL FIELD

The application relates to the technical field of trimming positioning end surface of wheel blank.

BACKGROUND ART

Aluminum alloy wheel needs to be machined after casting, so a positioning end surface of the casting blank will be reserved for machining positioning. At present, the wheel blank is positioned mostly by the use of a process wheel lip. The horizontal surface of the process wheel lip is used for the axial positioning, and the side surface of the process wheel lip is used for the radial positioning. In actual manufacture, there are many blank deformation problems in the casting blank, causing the unevenness of the positioning end surface of the wheel blank, leading to inaccurate positioning of the wheel machining and causing waste products of turning deviation. Therefore, it is necessary to trim the wheel positioning end surface so as to make the positioning wheel lip face and side surface be uniform, and improve the positioning accuracy of machining.

SUMMARY OF THE INVENTION

The object of the present application is to provide a device for high-precisely trimming the positioning end surface of a wheel blank, and the device may be used in automatic continuous manufacture, and may axially and radially trim the positioning end surface of the wheel blank independently, wherein the axial and radial trimming may be performed simultaneously and may realize closed-loop control. Therefore, the efficiency is high and the precision is high.

In order to achieve the above object, the technical solutions of the present application are as follows: the device for trimming the positioning end surface of the wheel blank is composed of a frame, a support plate, a clamping guiding rail, drive motors, a left sliding plate, a gear rack, a right sliding plate, a clamping cylinder, a shaft, rollers, a left cylinder, a left guiding rail, a left lifting platform, a right cylinder, a right guiding rail, a right lifting platform, a left servo motor, a coupler, a bearing seat, a left overturning platform, a left guiding pillar, a first cylinder, a first platform, a first servo motor, a first milling cutter, a first position regulating cylinder, slideways, sliding rails, a left sliding block, a second cylinder, an axial intelligent dial indicator, a right servo motor, a right overturning platform, a second position regulating cylinder, a right sliding block, a third cylinder, a right guiding pillar, a second platform, a first angle regulating cylinder, a first overturning plate, a second servo motor, a second milling cutter, a fourth cylinder, a third platform, a second angle regulating cylinder, a second overturning plate and a radial intelligent dial indicator.

The device for trimming the positioning end surface of the wheel blank is composed of a wheel positioning clamping system, an axial positioning surface trimming system and a radial positioning surface trimming system. The wheel positioning clamping system completes the loading, clamping and low-speed rotation of the wheel; the axial positioning surface trimming system firstly completes the detection of the wheel axial hop, and then completes the trimming of the axially positioning surface; the radial positioning surface trimming system firstly completes the detection of the wheel radial hop, and then completes the trimming of the radial positioning surface. The axial positioning surface trimming system and the radial positioning surface trimming system are independent of each other and complementary to each other, and the two systems accomplish the trimming of the positioning end surface of the wheel blank jointly. Because the closed-loop control is realized by detecting the hop firstly and then trimming based on the detection results, the system has higher precision.

The clamping guiding rail is symmetrically fixed on the support plate. The left sliding plate and the right sliding plate are symmetrically mounted on the clamping guiding rail, and are connected by the gear rack. The output end of the clamping cylinder is connected with the left sliding plate. The drive motors are symmetrically mounted on the left sliding plate and the right sliding plate, and the output ends of the drive motors are connected with the rollers. When the clamping cylinder drives the left sliding plate to move, under the action of the gear rack, the right sliding plate moves synchronously. The four rollers may position and clamp the wheel, and the drive motors drive the rollers to rotate. Under the action of friction, the wheel may rotate at low speed. This is the wheel positioning clamping system, which completes the loading, clamping and low-speed rotation of the wheel.

The left cylinder is fixed on the left side of the frame, the output end of the left cylinder is connected with the lifting platform, and the left cylinder controls the lifting platform to move up and down under the guidance of the left guiding rail. The lifting platform is of a cantilever structure. The left servo motor, which is fixed on the lifting platform and the output end of the left servo motor is connected with the left overturning platform, controls the turning of the left overturning platform. The two ends of the overturning platform are in a shaft shape and the middle is hollow and square. Slideways are symmetrically arranged on both left side and the right side inside the left overturning platform. The first position regulating cylinder is fixed inside the left overturning platform and the output end of the first position regulating cylinder is connected with the left sliding block. Two ends of the left sliding block are equipped with sliding rails. The sliding rails are matched with the slideways. The first position regulating cylinder may regulate the horizontal position of the left sliding block. The first cylinder is fixed above the left sliding block through a bracket and output end of the left sliding block is connected with the first platform. Under the guidance of left guiding pillar, the first cylinder controls the up and down motion of the first platform. The first servo motor is fixed on the first platform and the output end of the first servo motor is provided with the first milling cutter. The second cylinder is fixed below the left sliding block through the bracket and the output end of the second cylinder is provided with the axial intelligent dial indicator to detect the hop of the axial positioning surface of the wheel. The upper position and lower position of the axial intelligent dial indicator and the first milling cutter may be regulated by the left cylinder driving the left lifting platform up and down, so that the device may adapt to trim wheels at different heights. The horizontal and radial positions of the axial intelligent dial indicator and the first milling cutter may be regulated by the first position regulating cylinder driving the left sliding block to move horizontally, so that the device may adapt to trim wheels with different diameters. The feed of the first milling cutter may be realized by the first cylinder controlling the up and down motion of the first platform. The up and down motion of the axial intelligent dial indicator may be controlled by the second cylinder, so that the pointer of the axial intelligent dial indicator may contact the end surface of the wheel. The upside and downside position of the axial intelligent dial indicator and the first milling cutter may be switched circularly by the left servo motor controlling the overturn of the left overturning platform, so that the closed-loop control of detecting the hop firstly and then compensating the feed of the milling cutter according to the detection value is achieved. This is the axial positioning surface trimming system, which firstly completes the detection of the axial hop of wheels, and then completes the axial positioning surface trimming The right cylinder is fixed on the right side of the frame and the output end of the right cylinder is connected with the right lifting platform. The right lifting platform and the left lifting platform are symmetrical. Under the guidance of the right guiding rail, the right cylinder controls the right lifting platform to move up and down. The right lifting platform is also of a cantilever structure. The right servo motor, which is fixed on the right lifting platform and the output end of the right servo motor is connected with the right overturning platform, controls the overturning of the right overturning platform. The two ends of the overturning platform are in shaft shape and the middle is hollow and square. Inside the right overturning platform are symmetrically provided slideways on both left and right sides. The second position regulating cylinder is fixed inside the right overturning platform and the output end of the second position regulating cylinder is connected with the right sliding block. Two ends of the right sliding block are equipped with sliding rails. The sliding rails are matched with the slideways. The second position regulating cylinder may adjust the horizontal position of the right sliding block. The third cylinder is fixed above right sliding block through the bracket and the output end of the third cylinder is connected with the second platform. Under the guidance of right guiding pillar, the third cylinder controls the up and down motion of the second platform. The first overturning plate is hinged with the second platform. One end of the first angle regulating cylinder is hinged with the second platform and the other end of the first angle regulating cylinder is hinged with the first overturning plate. The overturning angel of the first overturning plate may be regulated by the expansion and contraction of the first angle regulating cylinder. The second servo motor is fixed on the first overturning plate and the output end of the second servo motor is connected with the second milling cutter. The fourth cylinder is fixed below the right sliding block through the bracket, and the output end of the fourth cylinder is connected with the third platform. The second overturning plate is hinged with the third platform. One end of the second angle regulating cylinder is hinged with the third platform and the other end of the second angle regulating cylinder is hinged with the second overturning plate. The overturning angle of the second overturning plate may be regulated by the expansion and contraction of the second angle regulating cylinder. The radial intelligent dial indicator is fixed on the second overturning plate. The angle regulation of the second milling cutter and the radial intelligent dial indicator enables the device to adapt to trim wheel blanks with different angles of radial end surface. The upper position and lower position of the radial intelligent dial indicator and second milling cutter may be regulated by the right cylinder driving the right lifting platform to move up and down, so that the device may adapt to trim wheel at different heights. The horizontal and radial positions of radial intelligent dial indicator and the second milling cutter may be regulated by the second position regulating cylinder driving the right sliding block to move horizontally, so that the device may adapt to trim wheels with different diameters. The feed of second milling cutter may be realized by the third cylinder controlling the up and down motion of the second platform. The up and down motion of the radial intelligent dial indicator may be controlled by the fourth cylinder, so that the pointer of the radial intelligent dial indicator may contact the end surface of the wheel. The upside and downside position of the radial intelligent dial indicator and second milling cutter may be switched circularly by the right servo motor controlling the overturn of the right overturning platform, so that the closed-loop control of detecting the hop firstly and then compensating the feed of the milling cutter according to the detection value is achieved. This is the radial positioning surface trimming system, which firstly completes the detection of the radial hop of wheels, and then completes the radial positioning surface trimming.

The working process of the device for trimming the positioning end surface of the wheel blank is as follows: firstly, regulating the upper position and lower position and the radial position of the axial intelligent dial indicator according to the size of the wheel produced on-line, so that the pointer of the is positioned directly above the axial positioning end surface of wheel blank; and regulating the upper and lower position, radial position and oblique angle of the radial intelligent dial indicator, so that the pointer of the radial intelligent dial indicator is positioned directly above the radial positioning end surface of the wheel blank. After the wheel enters the device, the clamping cylinder drives the left sliding plate to move. Under the action of the gear rack, the right sliding plate moves synchronously, and the four rollers may clamp and position the wheel; then the second cylinder and the fourth cylinder start synchronously, the second cylinder drives the pointer of the axial intelligent dial indicator to contact the axial positioning end surface of the wheel blank, and the fourth cylinder drives the pointer of the radial intelligent dial indicator to contact the radial positioning end surface of the wheel blank, and then the drive motor is activated to drive the wheel to rotate at a low speed to start detecting the hop of the positioning end surface of the wheel blank. When the wheel rotates for one turn, the axial hop of the positioning end surface is measured by the axial intelligent dial indicator, then the axial intelligent dial indicator is retraced and reset, the left servo motor is activated to drive the left overturning platform to rotate for 180°. At this time, the axial intelligent dial indicator rotates to the upper side, and the first milling cutter rotates to the lower side. The downward feed of the first milling cutter is determined according to the hop value, and the feed is fed back to the first cylinder. The first cylinder drives the first milling cutter to move downward to complete feeding, so that the trimming of the axial positioning end surface of the wheel blanks achieves a closed-loop control. While the axial positioning end surface is corrected, the radial positioning end surface is also corrected. When the wheel rotates for one turn, the radial hop of the positioning end surface is measured by the radial intelligent dial indicator, then the radial intelligent dial indicator is retraced and reset, the right servo motor is activated to drive the right overturning platform to rotate for 180°. At this time, the radial intelligent dial indicator rotates to the upper side and the second milling cutter rotates to the lower side. The downward feed of the second milling cutter is determined according to the hop value, and the feed is fed back to the third cylinder. The third cylinder drives the second milling cutter to move downward to complete feeding, so that the trimming of the radial positioning end surface of the wheel blank also achieves a closed-loop control. After the first milling cutter and the second milling cutter contact the positioning end surface, the wheel continues to rotate for one turn to complete the trimming After the trimming is completed, the first milling cutter and the second milling cutter are reset, and the left servo motor and the right servo motor are activated again, respectively driving the left overturning platform and the right overturning platform to rotate for 180°, so that the axial intelligent dial indicator and the radial intelligent dial indicator are turned to the lower side, and the initial position of the device is restored, and the roll track of the trimmed wheel is turned down. At this time, the trimming of one wheel is completed, and the cycle is repeated.

The device may trim each blank independently according to the different deformation of every blank. The axially positioning surface trimming system and the radial positioning surface trimming system are independent of each other and complementary to each other, and the two systems operate synchronously to accomplish the trimming of the positioning end surface of the wheel blank jointly. Because the closed-loop control is realized by detecting the hop firstly and then trimming based on the detection results, the device is precise and efficient. Furthermore, the device may also be used for trimming wheels with different external diameters, different wheel widths and different radial positioning surface angles, and has stronger versatility.

In figures: 1—frame, 2—support plate, 3—clamping guiding rail, 4—drive motor, 5—left sliding plate, 6—gear rack, 7—right sliding plate, 8—clamping cylinder, 9—shaft, 10—roller, 11—left cylinder, 12—left guiding rail, 13—left lifting platform, 14—right cylinder, 15—right guiding rail, 16—right lifting platform, 17—left servo motor, 18—coupler, 19—bearing seat, 20—left overturning platform, 21—left guiding pillar, 22—first cylinder, 23—first platform, 24—first servo motor, 25—first milling cutter, 26—first position regulating cylinder, 27—slideway, 28—sliding rail, 29—left sliding block, 30—second cylinder, 31—axial intelligent dial indicator, 32—right servo motor, 33—right overturning platform, 34—second position regulating cylinder, 35—right sliding block, 36—third cylinder, 37—right guiding pillar, 38—second platform, 39—first angle regulating cylinder, 40—first overturning plate, 41—second servo motor, 42—second milling cutter, 43—fourth cylinder, 44—third platform, 45—second angle regulating cylinder, 46—second overturning plate, and 47—radial intelligent dial indicator.

DETAILED DESCRIPTION OF THE INVENTION

The details and operation conditions of the specific device of the present application are given below in conjunction with the illustration of the accompanying drawings.

The device for trimming the positioning end surface of the wheel blank is composed of a frame 1, a support plate 2, a clamping guiding rail 3, drive motors 4, a left sliding plate 5, a gear rack 6, a right sliding plate 7, a clamping cylinder 8, a shaft 9, rollers 10, a left cylinder 11, a left guiding rail 12, a left lifting platform 13, a right cylinder 14, a right guiding rail 15, a right lifting platform 16, a left servo motor 17, a coupler 18, a bearing seat 19, a left overturning platform 20, a left guiding pillar 21, a first cylinder 22, a first platform 23, a first servo motor 24, a first milling cutter 25, a first position regulating cylinder 26, slideways 27, sliding rails 28, a left sliding block 29, a second cylinder 30, an axial intelligent dial indicator 31, a right servo motor 32, a right overturning platform 33, a second position regulating cylinder 34, a right sliding block 35, a third cylinder 36, a right guiding pillar 37, a second platform 38, a first angle regulating cylinder 39, a first overturning plate 40, a second servo motor 41, a second milling cutter 42, a fourth cylinder 43, a third platform 44, a second angle regulating cylinder 45, a second overturning plate 46 and a radial intelligent dial indicator 47.

The device for trimming the positioning end surface of the wheel blank is composed of a wheel positioning clamping system, an axial positioning surface trimming system and a radial positioning surface trimming system. The wheel positioning clamping system completes the loading, clamping and low-speed rotation of the wheel; the axial positioning surface trimming system firstly completes the detection of the wheel axial hop, and then completes the trimming of the axially positioning surface; the radial positioning surface trimming system firstly completes the detection of the wheel radial hop, and then completes the trimming of the radial positioning surface. The axial positioning surface trimming system and the radial positioning surface trimming system are independent of each other and complementary to each other, and the two systems accomplish the trimming of the positioning end surface of the wheel blank jointly. Because the closed-loop control is realized by detecting the hop firstly and then trimming based on the detection results, the system has higher precision.

Figure 1:
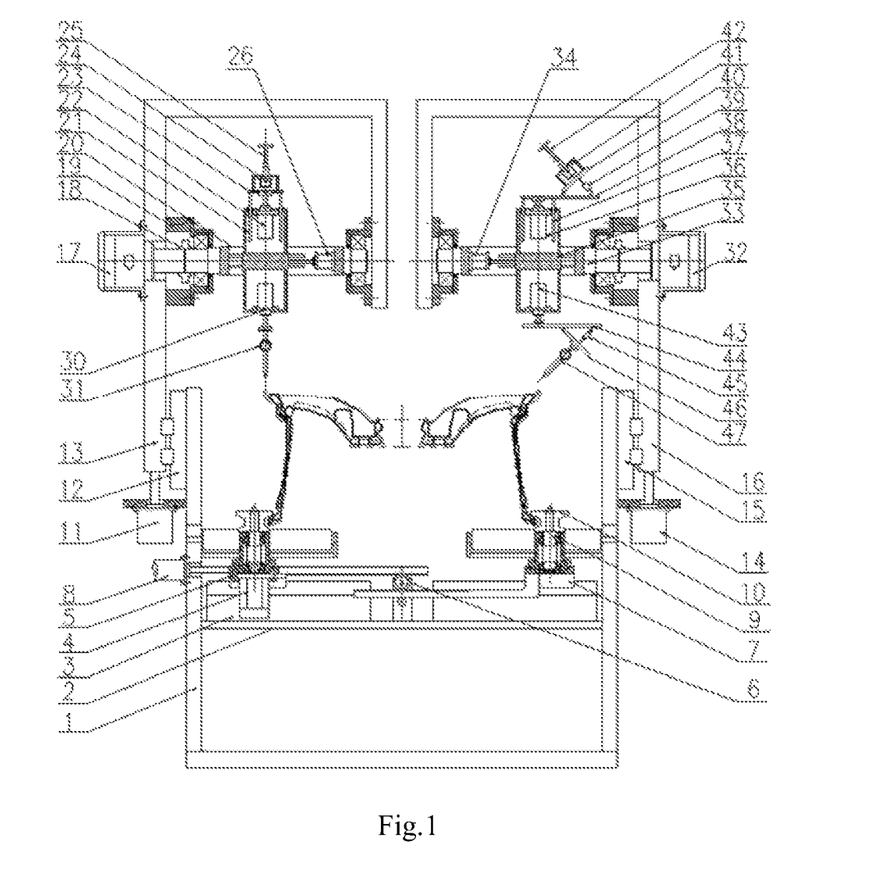
FIG. 1 is the main view of the device for trimming the positioning end surface of a wheel blank according to the present application.
Figure 2:
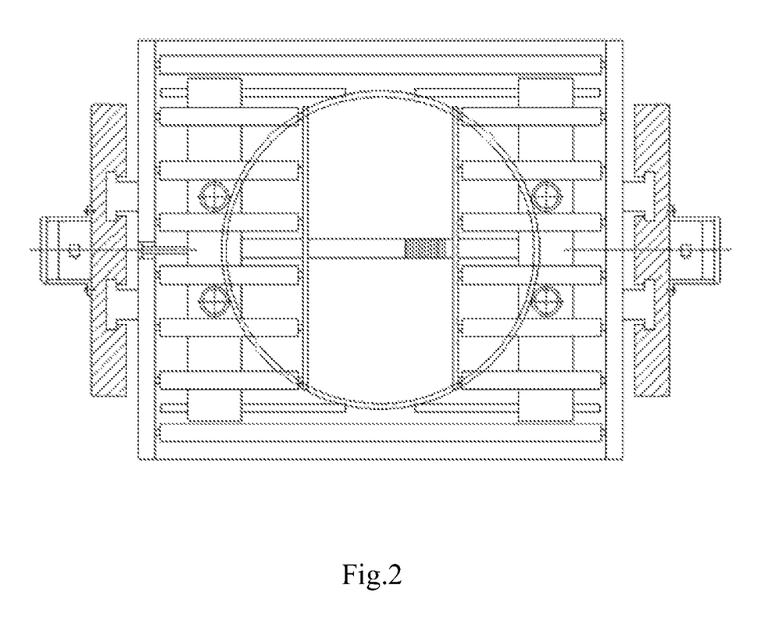
FIG. 2 is the top view of the device for trimming the positioning end surface of the wheel blank according to the present application.

The clamping guiding rail 3 is symmetrically fixed on the support plate 2. The left sliding plate 5 and the right sliding plate 7 are symmetrically mounted on the clamping guiding rail 3, and are connected by the gear rack 6. The output end of the clamping cylinder 8 is connected with the left sliding plate 5. The drive motors 4 are symmetrically mounted on the left sliding plate 5 and the right sliding plate 7, and the output ends of the drive motors 4 are connected with the rollers 10. When the clamping cylinder 8 drives the left sliding plate 5 to move, under the action of the gear rack 6, the right sliding plate 7 moves synchronously. The four rollers 10 may position and clamp the wheel, and the drive motors 4 drive the rollers 10 to rotate. Under the action of friction, the wheel may rotate at low speed. This is the wheel positioning clamping system, which completes the loading, clamping and low-speed rotation of the wheel.

Figure 3:
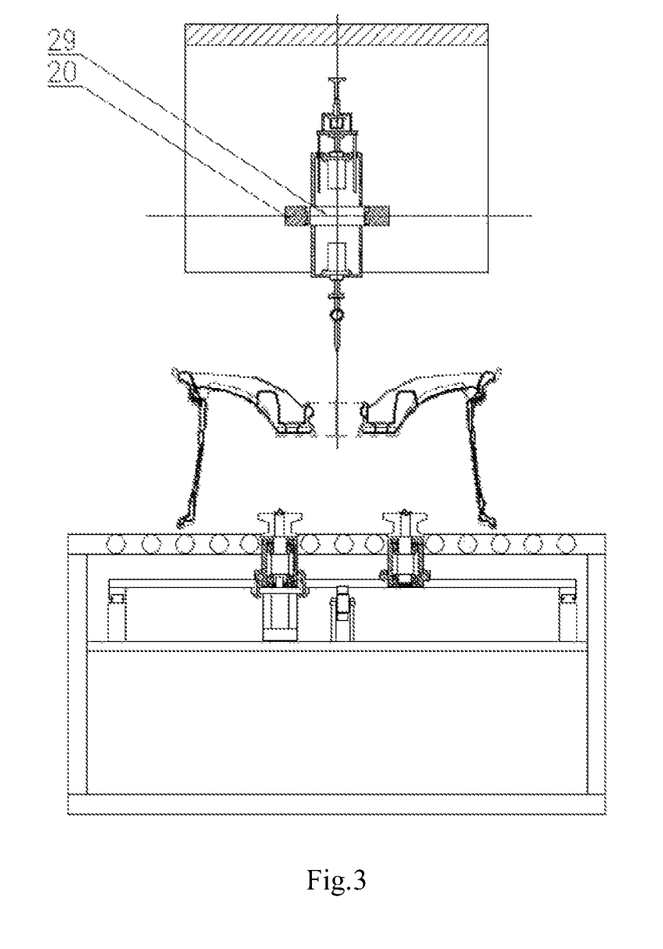
FIG. 3 is the left view of the device for trimming the positioning end surface of the wheel blank according to the present application.
Figure 4:
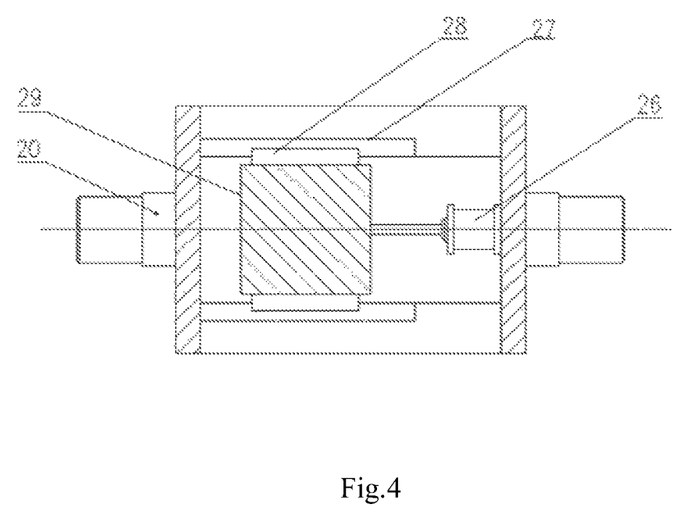
FIG. 4 is the top view of the left overturning platform of the device for trimming the positioning end surface of the wheel blank according to the present application.

The left cylinder 11 is fixed on the left side of the frame 1, the output end of the left cylinder 11 is connected with the lifting platform 13, and the left cylinder 11 controls the lifting platform 13 to move up and down under the guidance of the left guiding rail 12. The lifting platform 13 is of a cantilever structure. The left servo motor 17, which is fixed on the lifting platform 13 and the output end of the left servo motor 17 is connected with the left overturning platform 20, controls the turning of the left overturning platform 20. The two ends of the overturning platform are in a shaft shape and the middle is hollow and square. Slideways 27 are symmetrically arranged on both left side and the right side inside the left overturning platform 20. The first position regulating cylinder 26 is fixed inside the left overturning platform 20 and the output end the first position regulating cylinder 26 is connected with the left sliding block 29. Both ends of the left sliding block 29 are equipped with sliding rails 28. The sliding rails 28 are matched with the slideways 27. The first position regulating cylinder 26 may regulate the horizontal position of the left sliding block 29. The first cylinder 22 is fixed above the left sliding block 29 through a bracket and output end the left sliding block is connected with the first platform 23. Under the guidance of left guiding pillar 21, the first cylinder 22 controls the up and down motion of the first platform 23. The first servo motor 24 is fixed on the first platform 23 and the output end the first servo motor is provided with the first milling cutter 25. The second cylinder 30 is fixed below the left sliding block 29 through the bracket and the output end the second cylinder is provided with the axial intelligent dial indicator 31 to detect the hop of the axial positioning surface of the wheel. The upper position and lower position of the axial intelligent dial indicator 31 and the first milling cutter 25 may be regulated by the left cylinder 11 driving the left lifting platform 13 up and down, so that the device may adapt to trim wheels at different heights. The horizontal and radial positions of the axial intelligent dial indicator 31 and the first milling cutter 25 may be regulated by the first position regulating cylinder 26 driving the left sliding block 29 to move horizontally, so that the device may adapt to trim wheels with different diameters. The feed of the first milling cutter 25 may be realized by the first cylinder 22 controlling the up and down motion of the first platform 23. The up and down motion of the axial intelligent dial indicator 31 may be controlled by the second cylinder 30, so that the pointer of the axial intelligent dial indicator may contact the end surface of the wheel. The upside and downside position of the axial intelligent dial indicator 31 and the first milling cutter 25 may be switched circularly by the left servo motor 17 controlling the overturn of the left overturning platform 20, so that the closed-loop control of detecting the hop firstly and then compensating the feed of the milling cutter according to the detection value is achieved. This is the axial positioning surface trimming system, which firstly completes the detection of the axial hop of wheels, and then completes the axial positioning surface trimming.

The right cylinder 14 is fixed on the right side of the frame 1 and the output end the right cylinder 14 is connected with the right lifting platform 16. The right lifting platform 16 and the left lifting platform 13 are symmetrical. Under the guidance of the right guiding rail 15, the right cylinder 14 controls the right lifting platform 16 to move up and down. The right lifting platform 16 is also of a cantilever structure. The right servo motor 32, which is fixed on the right lifting platform 16 and the output end of the right servo motor 32 is connected with the right overturning platform 33, controls the overturning of the right overturning platform 33. The two ends of the overturning platform are in shaft shape and the middle is hollow and square. Inside the right overturning platform 33 are symmetrically provided slideways on both left and right sides. The second position regulating cylinder 34 is fixed inside the right overturning platform 33 and the output end the second position regulating cylinder 34 is connected with the right sliding block 35. Two ends of the right sliding block 35 are equipped with sliding rails. The sliding rails are matched with the slideways. The second position regulating cylinder 34 may adjust the horizontal position of the right sliding block 35. The third cylinder 36 is fixed above right sliding block 35 through the bracket and the output end the third cylinder 36 is connected with the second platform 38. Under the guidance of right guiding pillar 37, the third cylinder 36 controls the up and down motion of the second platform 38. The first overturning plate 40 is hinged with the second platform 38. One end of the first angle regulating cylinder 39 is hinged with the second platform 38 and the other end of the first angle regulating cylinder 39 is hinged with the first overturning plate 40. The overturning angel of the first overturning plate 40 may be regulated by the expansion and contraction of the first angle regulating cylinder 39. The second servo motor 41 is fixed on the first overturning plate 40 and the output end the second servo motor 41 is connected with the second milling cutter 42. The fourth cylinder 43 is fixed below the right sliding block 35 through the bracket, and the output end the fourth cylinder 43 is connected with the third platform 44. The second overturning plate 46 is hinged with the third platform 44. One end of the second angle regulating cylinder 45 is hinged with the third platform 44 and the other end of the second angle regulating cylinder 45 is hinged with the second overturning plate 46. The overturning angle of the second overturning plate 46 may be regulated by the expansion and contraction of the second angle regulating cylinder 45. The radial intelligent dial indicator 47 is fixed on the second overturning plate 46. The angle regulation of the second milling cutter 42 and the radial intelligent dial indicator 47 enables the device to adapt to trim wheel blanks with different angles of radial end surface. The upper position and lower position of the radial intelligent dial indicator 47 and second milling cutter 42 may be regulated by the right cylinder 14 driving the right lifting platform 16 to move up and down, so that the device may adapt to trim wheel at different heights. The horizontal and radial positions of radial intelligent dial indicator 47 and the second milling cutter 42 may be regulated by the second position regulating cylinder 34 driving the right sliding block 35 to move horizontally, so that the device may adapt to trim wheels with different diameters. The feed of second milling cutter 42 may be realized by the third cylinder 36 controlling the up and down motion of the second platform 38. The up and down motion of the radial intelligent dial indicator 47 may be controlled by the fourth cylinder 43, so that the pointer of the radial intelligent dial indicator may contact the end surface of the wheel. The upside and downside position of the radial intelligent dial indicator 47 and second milling cutter 42 may be switched circularly by the right servo motor 32 controlling the overturn of the right overturning platform 33, so that the closed-loop control of detecting the hop firstly and then compensating the feed of the milling cutter according to the detection value is achieved. This is the radial positioning surface trimming system, which firstly completes the detection of the radial hop of wheels, and then completes the radial positioning surface trimming The working process of the device for trimming the positioning end surface of the wheel blank is as follows: firstly, regulating the upper position and lower position and the radial position of the axial intelligent dial indicator 31 according to the size of the wheel produced on-line, so that the pointer of the axial intelligent dial indicator is positioned directly above the axial positioning end surface of wheel blank; and regulating the upper and lower position, radial position and oblique angle of the radial intelligent dial indicator 47, so that the pointer of the radial intelligent dial indicator is positioned directly above the radial positioning end surface of the wheel blank. After the wheel enters the device, the clamping cylinder 8 drives the left sliding plate 5 to move. Under the action of the gear rack 6, the right sliding plate 7 moves synchronously, and the four rollers 10 may clamp and position the wheel; then the second cylinder 30 and the fourth cylinder 43 start synchronously, the second cylinder drives the pointer of the axial intelligent dial indicator to contact the axial positioning end surface of the wheel blank, and the fourth cylinder drives the pointer of the radial intelligent dial indicator to contact the radial positioning end surface of the wheel blank, and then the drive motor 4 is activated to drive the wheel to rotate at a low speed to start detecting the hop of the positioning end surface of the wheel blank. When the wheel rotates for one turn, the axial hop of the positioning end surface is measured by the axial intelligent dial indicator 31, then the axial intelligent dial indicator 31 is retraced and reset, the left servo motor 17 is activated to drive the left overturning platform 20 to rotate for 180°. At this time, the intelligent dial indicator rotates to the upper side, and the first milling cutter 25 rotates to the lower side. The downward feed of the first milling cutter 25 is determined according to the hop value, and the feed is fed back to the first cylinder 22. The first cylinder 22 drives the first milling cutter 25 to move downward to complete feeding, so that the trimming of the axial positioning end surface of the wheel blanks achieves a closed-loop control. While the axial positioning end surface is corrected, the radial positioning end surface is also corrected. When the wheel rotates for one turn, the radial hop of the positioning end surface is measured by the radial intelligent dial indicator 47, then the radial intelligent dial indicator 47 is retraced and reset, the right servo motor 32 is activated to drive the right overturning platform 33 to rotate for 180 degrees. At this time, the radial intelligent dial indicator rotates to the upper side and the second milling cutter 42 rotates to the lower side. The downward feed of the second milling cutter 42 is determined according to the hop value, and the feed is fed back to the third cylinder 36. The third cylinder 36 drives the second milling cutter 42 to move downward to complete feeding, so that the trimming of the radial positioning end surface of the wheel blank also achieves a closed-loop control. After the first milling cutter 25 and the second milling cutter 42 contact the positioning end surface, the wheel continues to rotate for one turn to complete the trimming. After the trimming is completed, the milling cutter and the second milling cutter are reset, and the left servo motor 17 and the right servo motor 32 are activated again, respectively driving the left overturning platform 20 and the right overturning platform 33 to rotate for 180°, so that the axial intelligent dial indicator and the radial intelligent dial indicator are turned to the lower side, and the initial position of the device is restored, and the roll track of the trimmed wheel is turned down. At this time, the trimming of one wheel is completed, and the cycle is repeated.

The device may trim each blank independently according to the different deformation of every blank. The axial positioning surface trimming system and the radial positioning surface trimming system are independent of each other and complementary to each other, and the two systems operate synchronously to accomplish the trimming of the positioning end surface of the wheel blank jointly. Because the closed-loop control is realized by detecting the hop firstly and then trimming based on the detection results, the device is precise and efficient. Furthermore, the device may also be used for trimming wheels with different external diameters, different wheel widths and different radial positioning surface angles, and has stronger versatility.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A device for trimming the positioning end surface of a wheel blank, comprising a frame, a support plate, a clamping guiding rail, drive motors, a left sliding plate, a gear rack, a right sliding plate, a clamping cylinder, a shaft, rollers, a left cylinder, a left guiding rail, a left lifting platform, a right cylinder, a right guiding rail, a right lifting platform, a left servo motor, a coupler, a bearing seat, a left overturning platform, a left guiding pillar, a first cylinder, a first platform, a first servo motor, a first milling cutter, a first position regulating cylinder, slideways, sliding rails, a left sliding block, a second cylinder, an axial intelligent dial indicator, a right servo motor, a right overturning platform, a second position regulating cylinder, a right sliding block, a third cylinder, a right guiding pillar, a second platform, a first angle regulating cylinder, a first overturning plate, a second servo motor, a second milling cutter, a fourth cylinder, a third platform, a second angle regulating cylinder, a second overturning plate and a radial intelligent dial indicator, wherein that the lifting platform is of a cantilever structure, the left servo motor is fixed on the lifting platform and an output end of the left servo motor is connected with the left overturning platform, and the two ends of the left overturning platform are in a shaft shape and the middle is hollow and square; slideways are symmetrically arranged on both left side and the right side inside the left overturning platform, the first position regulating cylinder is fixed inside the left overturning platform and an output end of the first position regulating cylinder is connected with the left sliding block, two ends of the left sliding block are equipped with sliding rails, the sliding rails are matched with the slideways, and the first position regulating cylinder is configured to regulate the horizontal position of the left sliding block; the first cylinder is fixed above the left sliding block through a bracket and an output end of the left sliding block is connected with the first platform, the first servo motor is fixed on the first platform and an output end of the first servo motor is provided with the first milling cutter, the second cylinder is fixed below the left sliding block through the bracket and an output end of the second cylinder is provided with the axial intelligent dial indicator to detect the hop of the axial positioning surface of the wheel.

2. The device for trimming the positioning end surface of the wheel blank according to claim 1, wherein that the right lifting platform and the left lifting platform are symmetrical, the right lifting platform is also of a cantilever structure, the right servo motor is fixed on the right lifting platform and the output end of the right servo motor is connected with the right overturning platform, the second position regulating cylinder is fixed inside the right overturning platform and the output end of the second position regulating cylinder is connected with the right sliding block, the third cylinder is fixed above right sliding block through the bracket and an output end of the third cylinder is connected with the second platform, the first overturning plate is hinged with the second platform, one end of the first angle regulating cylinder is hinged with the second platform and the other end of the first angle regulating cylinder is hinged with the first overturning plate, the overturning angel of the first overturning plate is configured to be regulated by the expansion and contraction of the first angle regulating cylinder, the second servo motor is fixed on the first overturning plate and an output end of the second servo motor is connected with the second milling cutter, the fourth cylinder is fixed below the right sliding block through the bracket and an output end of the fourth cylinder is connected with the third platform, the second overturning plate is hinged with the third platform, one end of the second angle regulating cylinder is hinged with the third platform and the other end of the second angle regulating cylinder is hinged with the second overturning plate, the overturning angle of the second overturning plate is configured to be regulated by the expansion and contraction of the second angle regulating cylinder; the radial intelligent dial indicator is fixed on the second overturning plate to detect the hop of the radial positioning surface of the wheel.

* * * * *